United States Patent [19]
Hirtz

[11] Patent Number: 5,156,092
[45] Date of Patent: Oct. 20, 1992

[54] DUAL TRACK PERMANENT WAY

[76] Inventor: Helmut Hirtz, Alemannenstrasse 7, 1000 Berlin 28, Fed. Rep. of Germany

[21] Appl. No.: 753,899

[22] Filed: Sep. 3, 1991

[30] Foreign Application Priority Data

Sep. 3, 1990 [DE] Fed. Rep. of Germany ....... 4028197

[51] Int. Cl.$^5$ .................. B60L 13/04; E01B 25/12
[52] U.S. Cl. .................. 104/282; 104/130.1
[58] Field of Search .............. 104/281, 282, 292, 290, 104/130.1, 100, 108, 286, 294, 89, 93, 121

[56] References Cited

U.S. PATENT DOCUMENTS

| | | | |
|---|---|---|---|
| 3,233,559 | 2/1966 | Smith et al. | 104/292 |
| 3,590,743 | 7/1971 | Larson | 104/89 X |
| 3,930,451 | 1/1976 | Huebner et al. | 104/292 X |
| 3,937,150 | 2/1976 | Miericke et al. | 104/281 |
| 3,964,398 | 6/1976 | Breitling | 104/130.1 |
| 4,454,820 | 6/1984 | Raschbichler | 104/281 |
| 4,587,472 | 5/1986 | Steinmetz et al. | 104/290 X |
| 4,731,569 | 3/1988 | Bohn | 104/290 X |
| 4,870,906 | 10/1989 | Schaffer et al. | 104/130.1 |

FOREIGN PATENT DOCUMENTS

| | | | |
|---|---|---|---|
| 93507 | 8/1978 | Japan | 104/286 |
| 136006 | 10/1979 | Japan | 104/130.1 |

Primary Examiner—Robert J. Oberleitner
Assistant Examiner—Kevin D. Rutherford
Attorney, Agent, or Firm—Nils H. Ljungman and Associates

[57] ABSTRACT

The invention concerns a dual rail track permanent way for a wheel/rail system and a magnetic rail system whose carriages are of a height which lies within the clearance profile of track, the guiding magnets are situated inside the span of the carrier magnets, next to each rail of the rail track a magnetic rail runs outside the clearance profile of rail track and opening points are provided at which one system can be sideways displaced in relation to the other system and a section of the magnetic rail which passes through the clearance profile of rail track is designed as a gate which can be swung out of the said clearance profile and the operating equipment of the wheel/rail system is fitted outside the clearance profile of the magnetic track system.

18 Claims, 16 Drawing Sheets

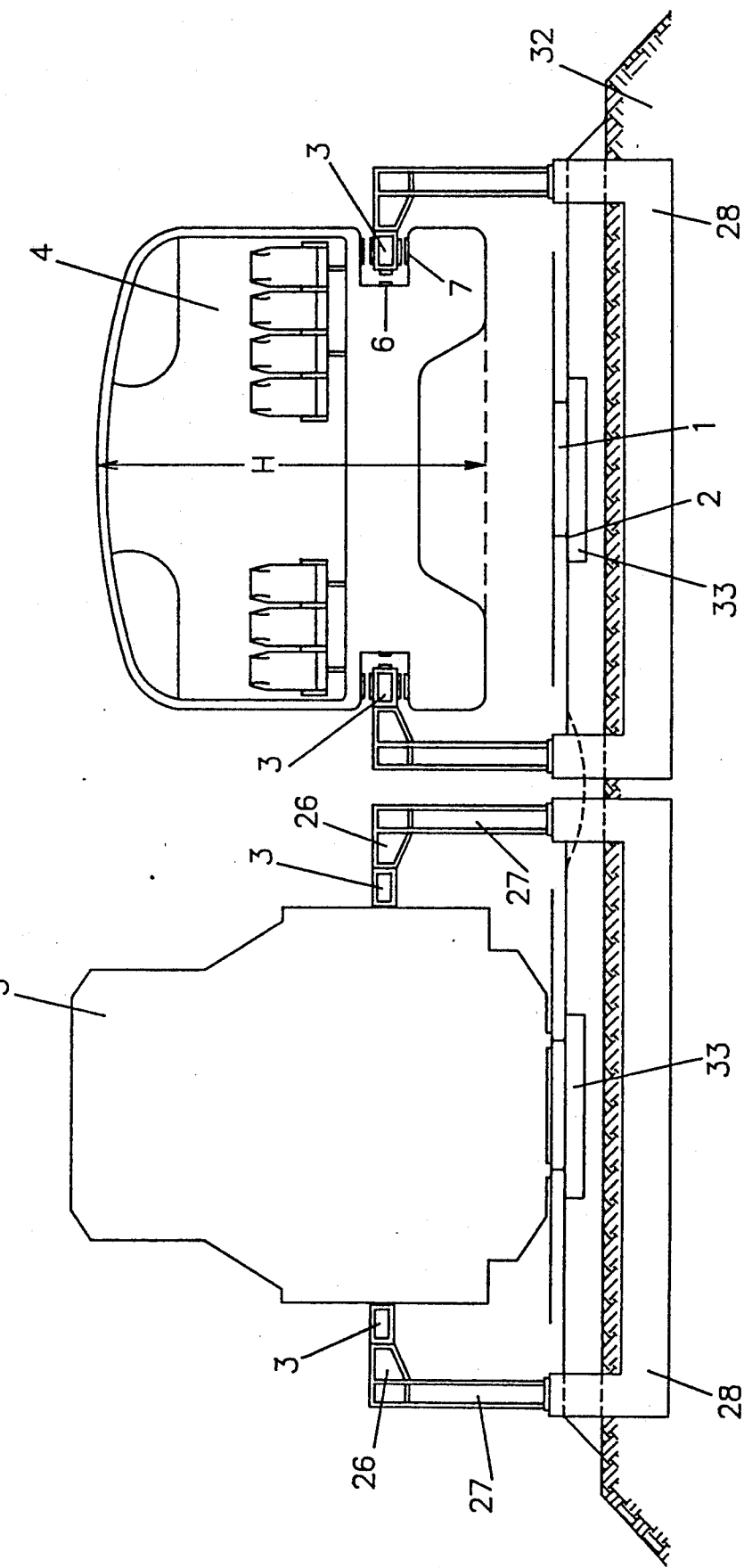

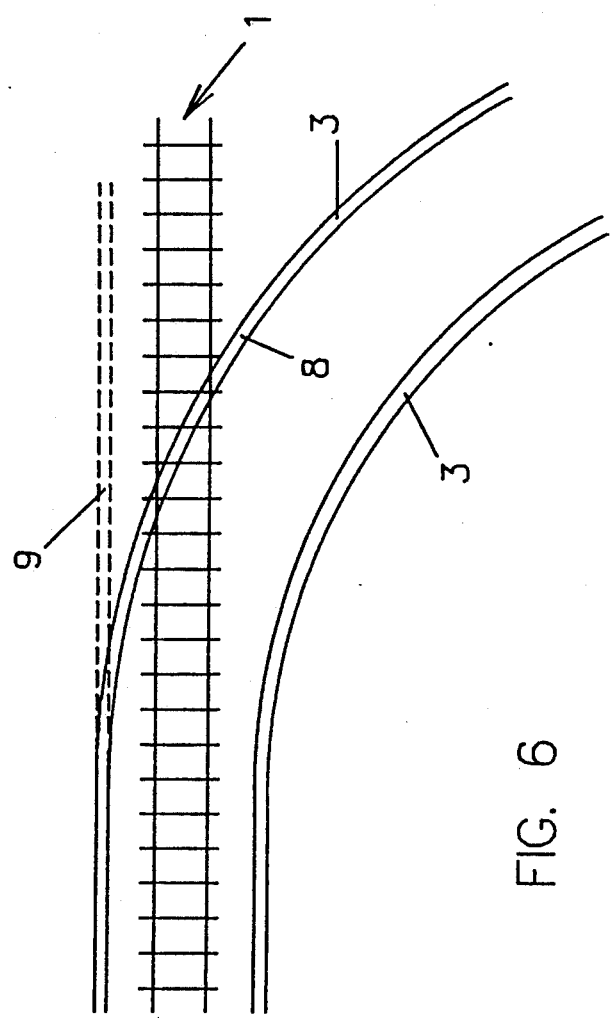

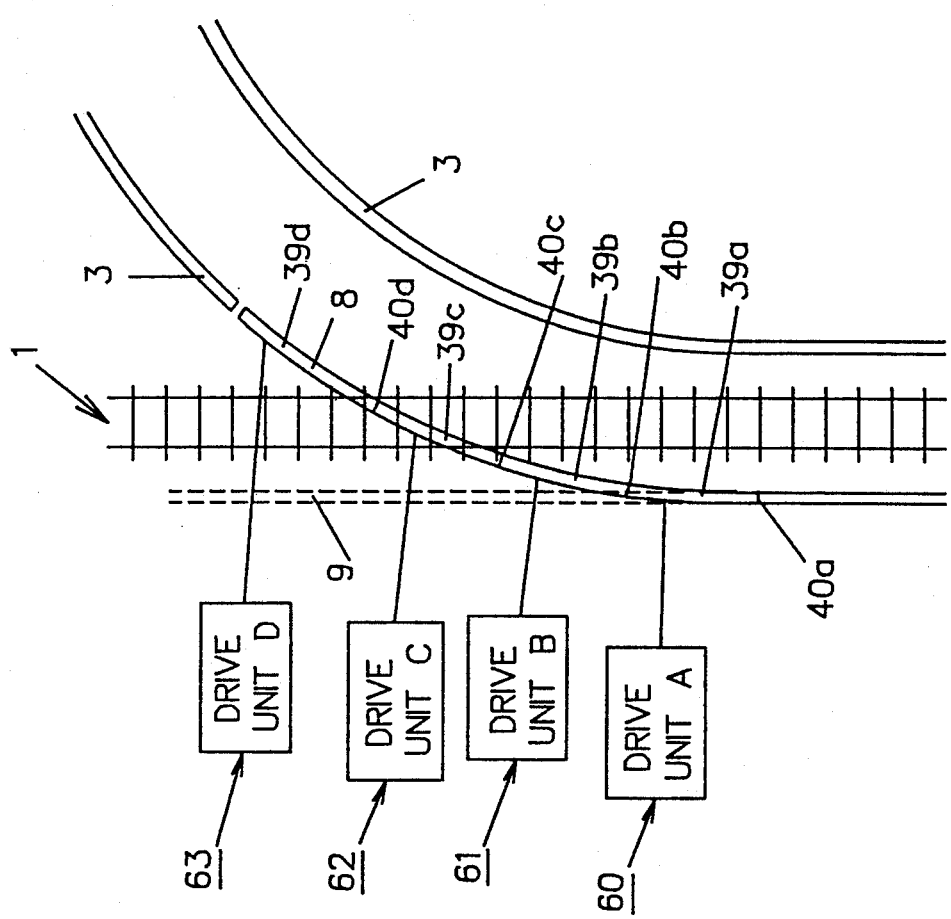

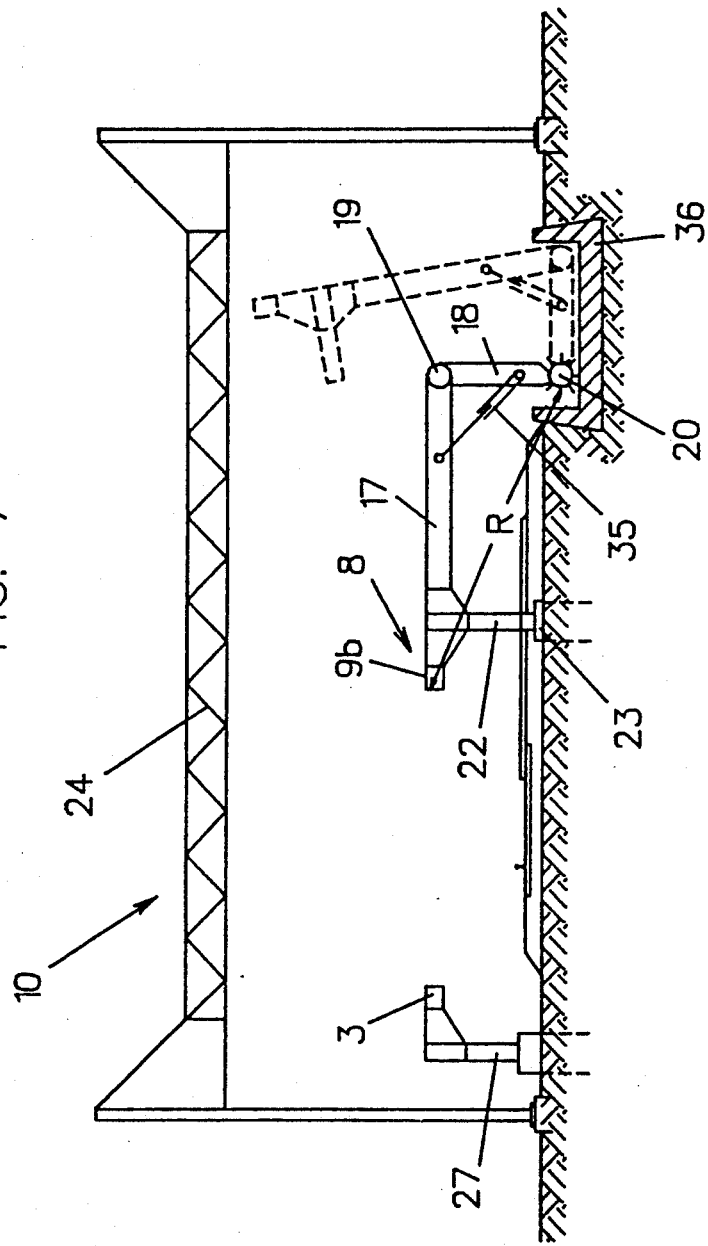

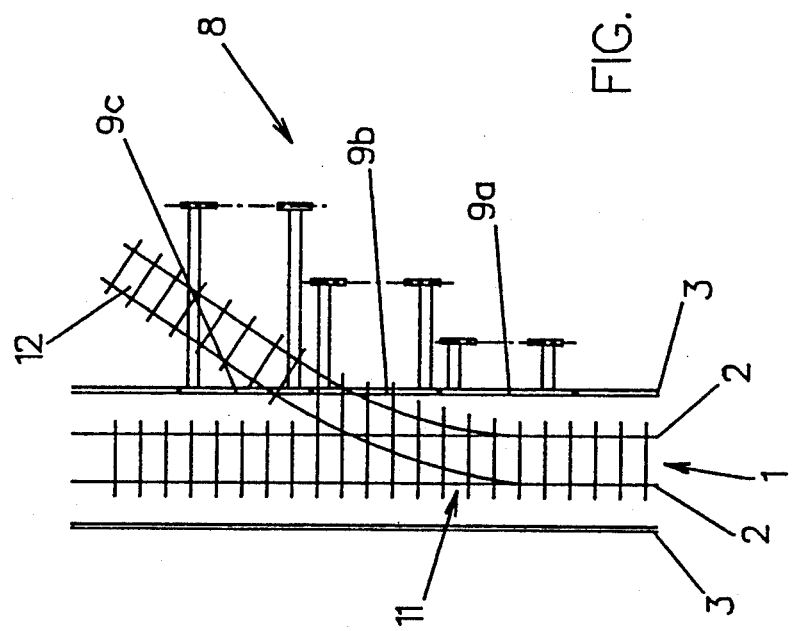

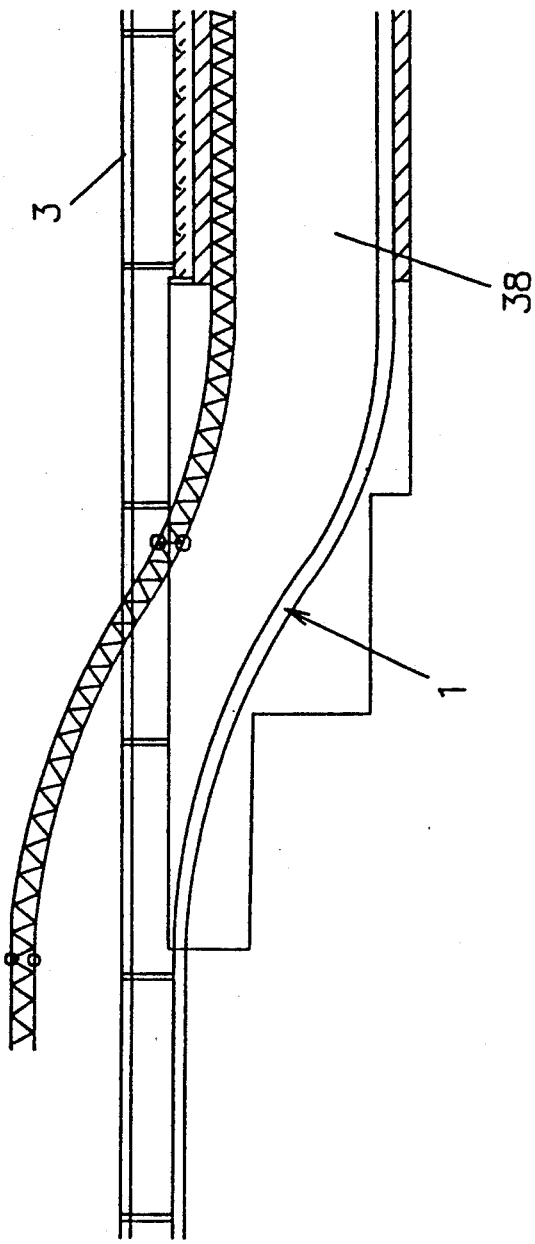

DUAL TRACK PERMANENT WAY

BACKGROUND OF THE INVENTION

1. Field of the Invention

The invention concerns a dual track permanent way.

2. Background Information

The demand for fast, long distance means of transport is growing. At present, this demand is being satisfied by increasing the air lines capacities by the enlarging of existing airports and construction of new ones, by introduction of more efficient i.e. larger and faster aircraft and by increasing the turnaround frequency of flights. This process, however, affects the ecology to an ever more noticeable degree. The resistance of the population is on the increase. On the other hand, the situation would become very much more critical if the existing capacities of the air communications were to be reduced.

As an alternative, one could consider a substantial increase of travelling speeds of other existing means of transport. With the motor vehicle, the possibilities in this respect are practically exhausted. The construction of more highways, in particular motorways and even faster vehicles is not possible any more. At present efforts are made worldwide with a view to improving the rail transport. With the increase of speed of the rail transport system, the environment is increasingly affected by the mechanical noise, air resistance noise and by the vibration shock which increases by the square of the rate of train speed increase. At a similar rate an increase of wear, material fatigue on rails and rail fixings and, above all on the wheel assemblies, takes place.

The known magnetic rail road system reduced the environmental impact to a considerable extent and practically annulled the wear aspect or, anyway, reduced it to within tolerable limits. The promoters of the high-speed rail tracks of the wheel/rail systems are now considering a replacement of this system by a magnetic track system. Construction of new rail tracks for the magnetic rail track is being planned. The decisive disadvantage of this planning is the fact that it cannot be fitted into the existing wheel/rail system. Furthermore, the magnetic track systems have this disadvantage that they are mainly laid out for the transport of persons. It follows, that the existing rail tracks cannot be replaced but have to be operated parallel to the magnetic rail systems to be constructed. In densely populated countries such plans create ecological problems and very strong objections to the extent that the criteria for the construction of magnetic rail systems on selected routes, cannot be met as a rule.

OBJECT OF THE INVENTION

The object of the invention is to produce a new style track permanent way which is designed as a dual track permanent way for both a wheel/rail and magnetic rail system.

SUMMARY OF THE INVENTION

An advantageous dual track permanent way is provided for a wheel/rail system and a magnetic track system. The overall dimensions of the magnetic rail system's carriages are selected to fit inside the clearance profile of the rail line and in particular of the rail vehicles. The guiding magnets of the magnetic system wagons lie inside the clearance of the carrier magnets. This design makes it possible for the magnetic rail of this dual track permanent way to run outside the clearance profile of the rail line, along each rail of the wheel/rail system. Since it may be necessary in certain situations, such as on railway stations and some other places, to separate the wheel/rail system from the magnetic track system and vice versa, provision is made in the dual track permanent way for the opening points at which one system is diverted sideways in relation to the other system. In this way, for example, the rail line of the wheel/rail system can be taken out sideways of the magnetic rail which will continue to run straight on. It is also possible, however, to let the rails of the wheel/rail system run straight on while the magnetic rails of the magnetic track system are directed sideways.

Advantageously, the magnetic rail section at the opening points which shifts the rail track clearance profile, is designed as a gate which can swing outward from that clearance profile. With an outwardly swinging gate, the means of transport which run on the rails can proceed through the open section of the magnetic rail lines. A special advantage is achieved at this dual track permanent way by the fact that the operational equipments of the wheel/rail system are positioned outside the clearance profile of the magnetic track system. This dual track permanent way, according to the invention, is designed so that the wheel/rail as well as the magnetic track system can be laid out on the same plane so that the existing routes of the wheel/rail system can be equipped in a most simple way to accommodate the dual traffic. The dual track permanent way, according to the invention, is designed so that both systems do not interfere with one another and the opening points make it possible, in particular in the area of railway stations, to run the systems jointly or separately when a different design of certain fixed features of the station such as e.g. the platforms could be required.

Of particular advantage is the fact that on the same constructional level on which the rails are laid, heavy-goods traffic of the wheel/rail system can be operated parallel to the fast magnetic track traffic. The dual track permanent way enables the integration of the magnetic track system into the existing line network of normal railway traffic.

In one advantageous version of the invention, the magnetic rail section at the opening point which shifts the rail clearance profile, the turn off point or the curve switch points, is constructed as a gate that swings outward in a horizontal plane. By means of branch-off sets of the rails, the two systems can be separated or brought together again. When the conventional rail track is to maintain its direction and the magnetic rails have to be diverted to the right or to the left, a curved section of the magnetic rail track which switches the clearance profile of the straight running track for the conventional rail traffic, and the said section runs parallel to the rail track, an open gate is thus created. When, at an opening point the rail track of the wheel/rail system is switched on to a branch-off rail track to the right or left, the swivelling end of the gate is supported by a wheel box which could be driven over along one of the branch-off or curve track rails which cross the rail track. In another advantageous version of the invention, the gate section of the magnetic track is flexible so that this section can be bent out of the switch points of the branch-off track or of a curved rail track.

For the purpose of swivelling or outbending, the swivelling end of the gate is connected with an actuating drive mechanism.

In another advantageous version of an opening point the section of the magnetic rail which offsets the track clearance profile of the wheel/rail system, does not swivel horizontally but upwards i.e. is so designed that one can swivel the curved tracks in the vertical plane.

Because on swivelling upwards the upper conduits of the wheel/rail system could limit the swivelling travel path, this magnetic rail section is advantageously mounted on two-arm articulated linkages which fold together during the outward swinging whereas the swinging radius is reduced and vice versa. These two-arm articulated links constitute a triangular articulated frame whose swivel joints are the articulations of the rotation drive mechanism, the hinges and the bearing of the magnetic rail. When, during the upswinging the articulation linkage is folded together, the distance between the magnetic rail and the rotation drive point is reduced. During the return swinging this distance will be increased which means that the swinging radius, depending on the direction of the movement, is either reduced or increased. In this version the advantageous layout is such that the swinging radius is contained within the limits determined by the upper conduit. For the action of folding or unfolding of the linkage, both links are advantageously connected with each other by means of a working cylinder.

It is advantageous to subdivide the magnetic rail section into at least two gate sections. In one particularly advantageous version, the two links in resting position form a right angle and the relevant gate section is supported by positively fixed posts. The positive fixing can be achieved for instance by means of trunnions provided in the rail track permanent way which engage into the fixing holes in the posts on which the magnetic rail is mounted.

Another version is possible within the framework of this invention, namely that at the opening points the magnetic track system can be swivelled upwards in relation to the wheel/rail system and the wheel/rail system can be swivelled downwards in relation to the magnetic track system. In this version the separation takes place in such a way that the system that has been moved arrives at a different level.

In view of the fact that the wheel/rail system in most cases is powered via an overhead line, in the portion of the overhead line in which the magnetic rail is swung upwards, a window is provided that can be either tilted upwards or shifted sideways. When the magnetic track has to be swung upwards, this window will be opened by either upward tilting or sideways shifting so that the magnetic railway can "drive through" the overhead line.

When the wheel/rail system is displaced downwards in relation to the magnetic track system, a cutting is to be made in the earth and fitted with supporting walls on which, in this section, the magnetic track is mounted. Now the wheel/rail system can be further led through a tunnel.

One aspect of the invention resides broadly in a dual track permanent way for combined use by both wheeled railway carriages and magnetic levitation railway carriages, the magnetic levitation railway carriages having carrier magnets for levitating the magnetic levitation railway carriages and guide magnets for directing the magnetic levitation railway carriages, said dual track permanent way comprising: a wheeled railway track for guiding the wheeled railway carriages; a plurality of magnetic levitation rails for guiding the magnetic levitation railway carriages; at least one of said wheeled railway track, said plurality of magnetic levitation rails, and the wheeled railway carriages being configured to define a first clearance profile through which the wheeled railway carriages operate, which first clearance profile has at least a first height dimension and a first width dimension; at least one of said wheeled railway track, said plurality of magnetic levitation rails, and the magnetic levitation railway carriages being configured to define a second clearance profile through which the magnetic levitation railway carriages operate, which second clearance profile has at least a second height dimension and a second width dimension; said second height dimension through which the magnetic levitation railway carriages operate being within said first height dimension through which the wheeled railway carriages operate; means for supporting said plurality of magnetic levitation rails being disposed outside said first clearance profile; and said plurality of magnetic levitation rails comprising magnets disposed on said plurality of magnetic levitation rails, said rail magnets being for magnetically cooperating with the carrier magnets and guide magnets of the magnetic levitation railway carriages for levitating and directing the magnetic levitation railway carriages.

BRIEF DESCRIPTION OF THE DRAWINGS

Embodiments of the invention will be explained in the following description with reference to the figures of the drawings.

They show:

FIGS. 1 to 3: cross section view of versions of a double track railway,

FIG. 6: schematic representation of a further opening point,

FIG. 6a: schematic representation of a further opening point,

FIG. 7: cross section view of an opening point at which the gate is swung upwards, FIG. 8: schematic top view of the opening point shown in FIG. 7, FIG. 9: schematic view of an opening point at which the magnetic track system is swung upwards, FIG. 10: longitudinal sectional representation of an opening point at which the wheel/rail system is displaced downwards.

DESCRIPTION OF THE PREFERRED EMBODIMENTS

Figure 1A:
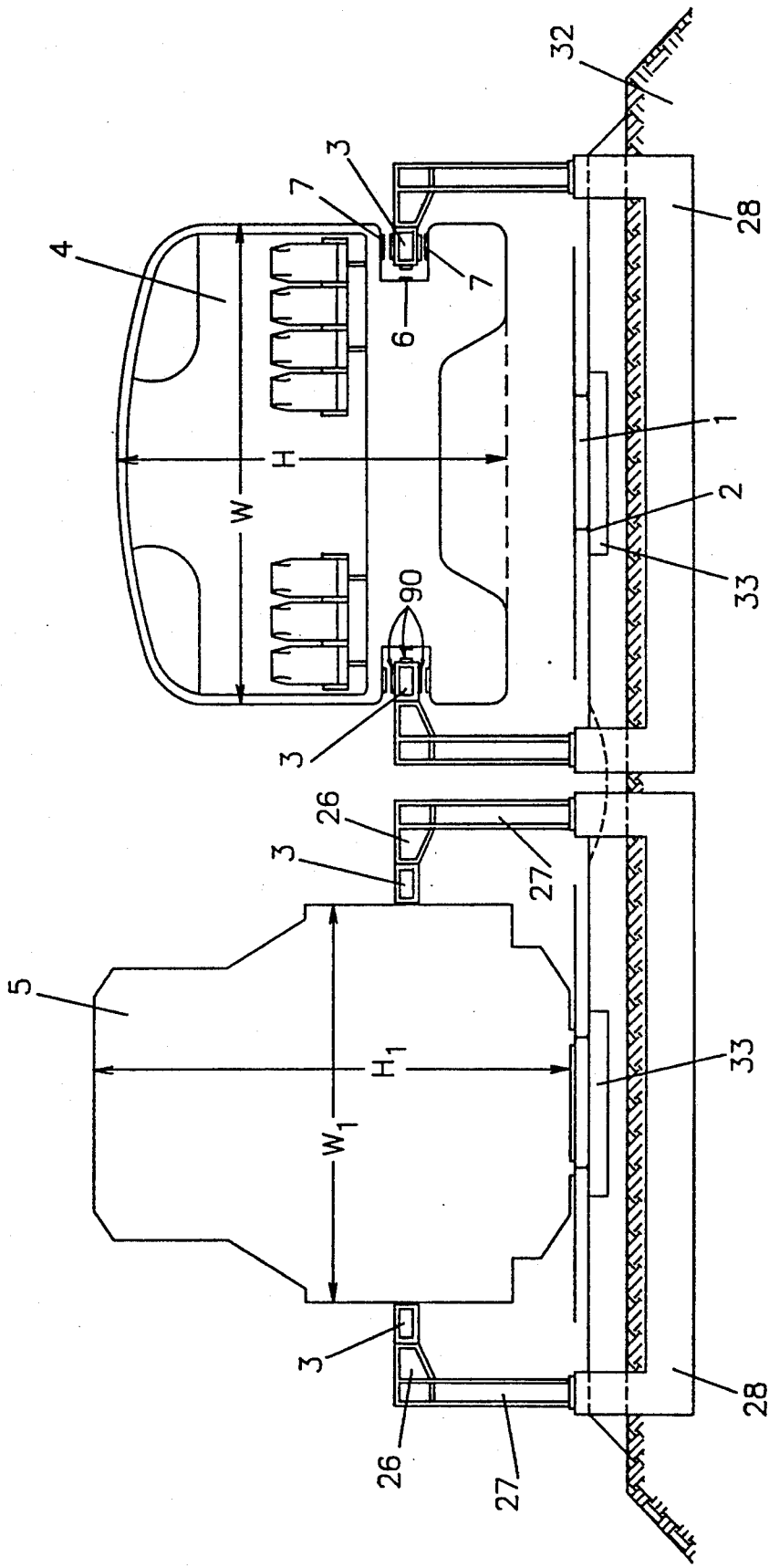
FIG. 1a: cross section view of a version of a double track railway.

FIG. 1 shows a cross section of a double track railway. In the ground formation 32 foundation beams 28 are bedded-in, one next to another. These foundation beams extend throughout under the rail tracks. The rail track 1 has the usual sleepers 33 to which the rails 2 are fixed. The rail tracks are bedded in the usual broken stone base. The conventional railway trains of the wheel/rail system move on the rail tracks 1 whose track clearance profile is shown on the outline 5. The foundation beams 28 carry the posts 27 on which the magnetic rails 3 are fixed with brackets 26 in such a way that these run next to the rails 2 outside the track clearance profile 5.

Figure 2:
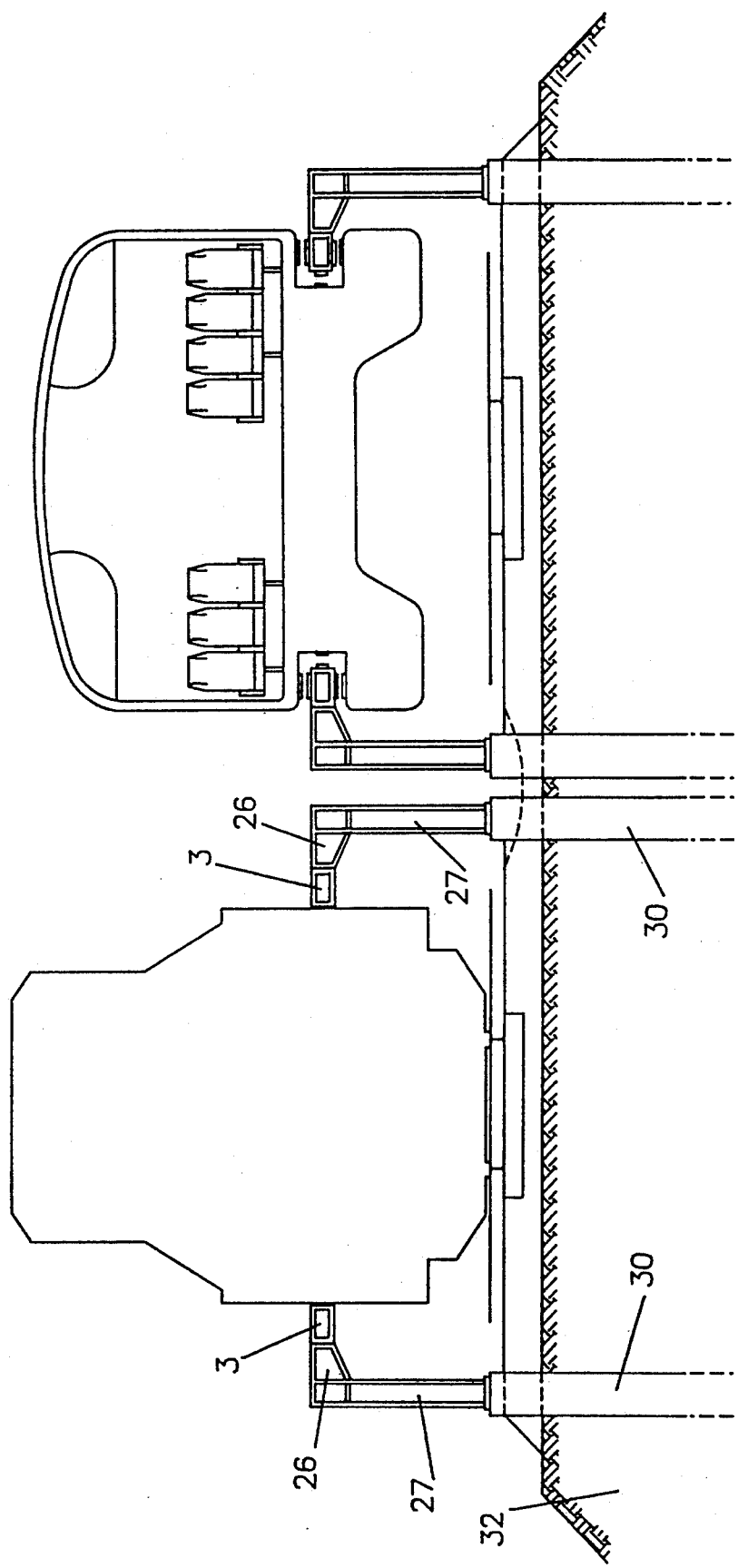

The carriages of the magnetic track system are designed in such a way that their height H lies inside the track clearance profile 5. The guiding magnets 6 of the magnetic rail carriages 4, lie within the rail clearance created by the positioning of the carrier magnets 7. In other words, the arrangement is such that the magnetic system of the carriages 4 forms an open "U" shape into which the magnetic rails 3 fit. In the version shown on FIG. 2, the posts 27 are mounted on uprights 30 sunk in the earth base 32.

FIG. 1a shows the wheeled railway clearance profile 5 having a height $H_1$ and a width $W_1$. In addition the magnetic levitation railway carriage 4 has a clearance profile represented by the outer border of the magnetic levitation railway carriage 4 and the lower broken line. The magnetic levitation railway carriage has a width W. Rail magnets 90 are mounted on magnetic levitation rails 3.

Figure 3:
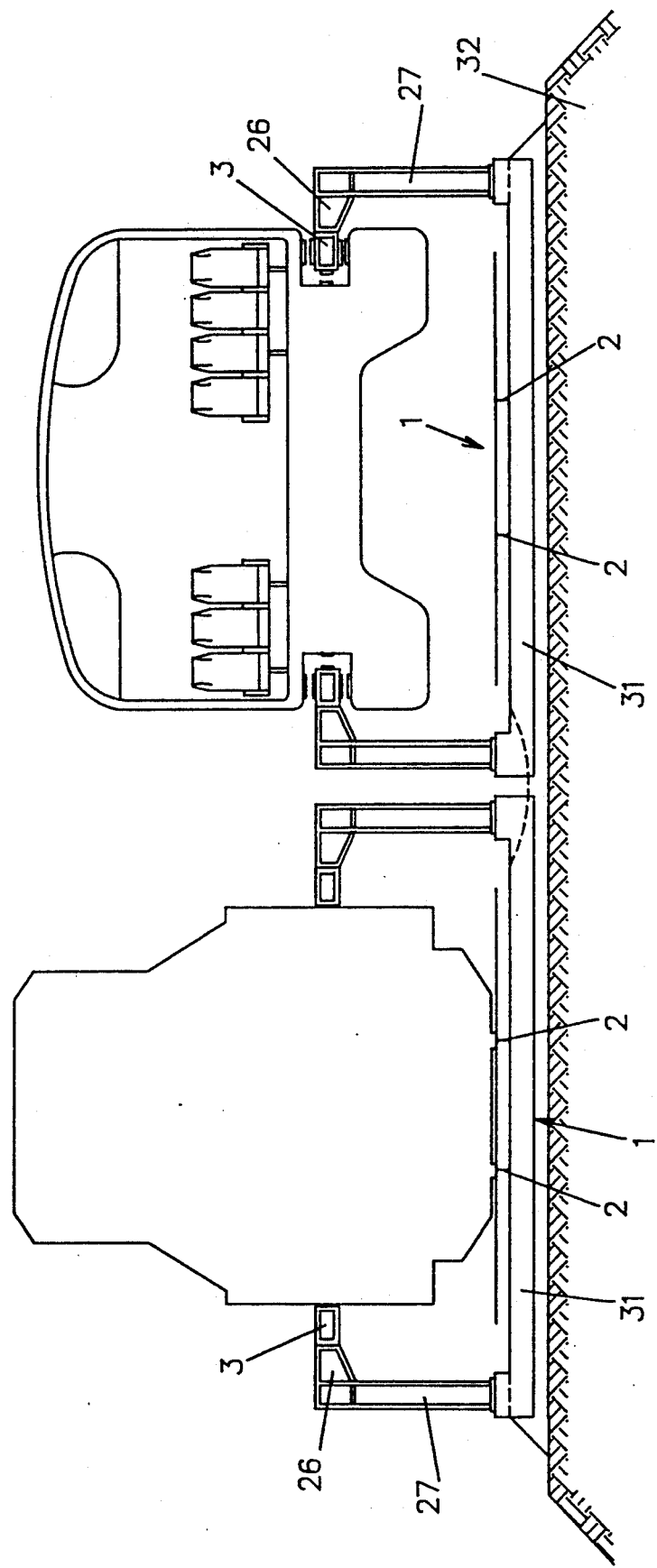

In the embodiment illustrated in FIG. 3 special sleepers 31 are bedded in the earth base 32. As is schematically shown, the rails 2 of the rail track 1 are directly laid upon these special sleepers 31. The special sleepers are designed to carry also the uprights 27 on which the magnetic rails 3 are fixed by means of brackets 26.

Figure 4:
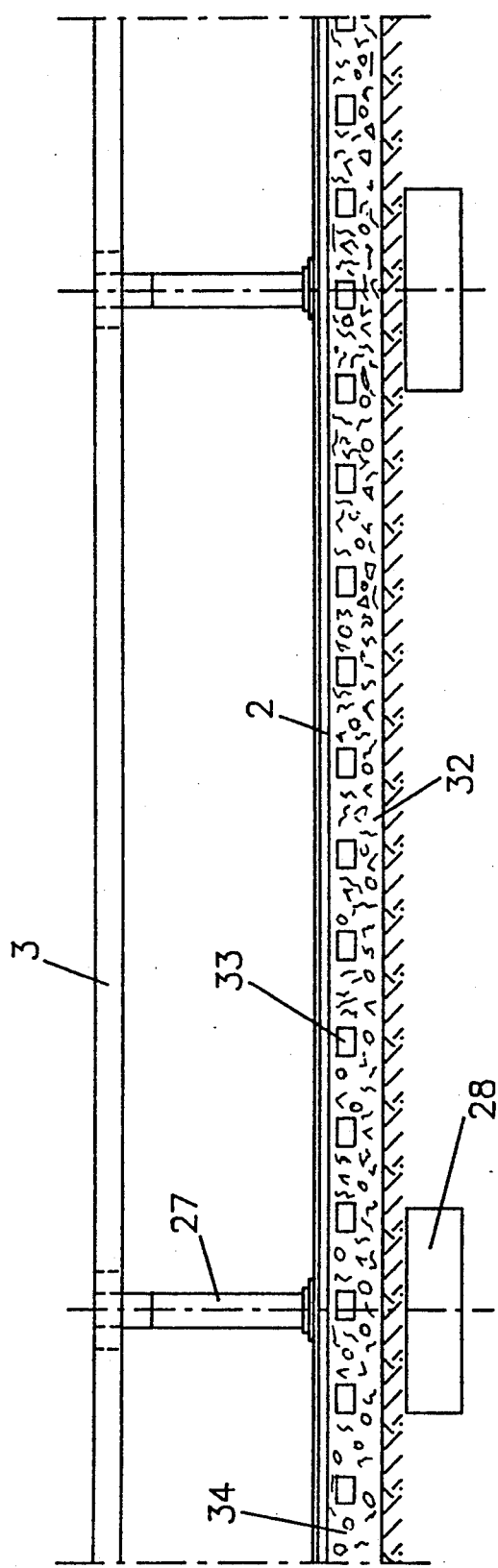
FIG. 4: longitudinal section of a dual track permanent way.

FIG. 4 shows a longitudinal section of the dual track permanent was version shown on FIG. 1.

It can be seen that the foundation beams 28 are bedded in the earth base 32 and that they carry the uprights 27 for the magnetic rails 3. Upon the earth base 32 there is a broken stone layer 34 and the sleepers 33 supporting the rails 2 are bedded in that broken stone layer 34.

Figure 5:
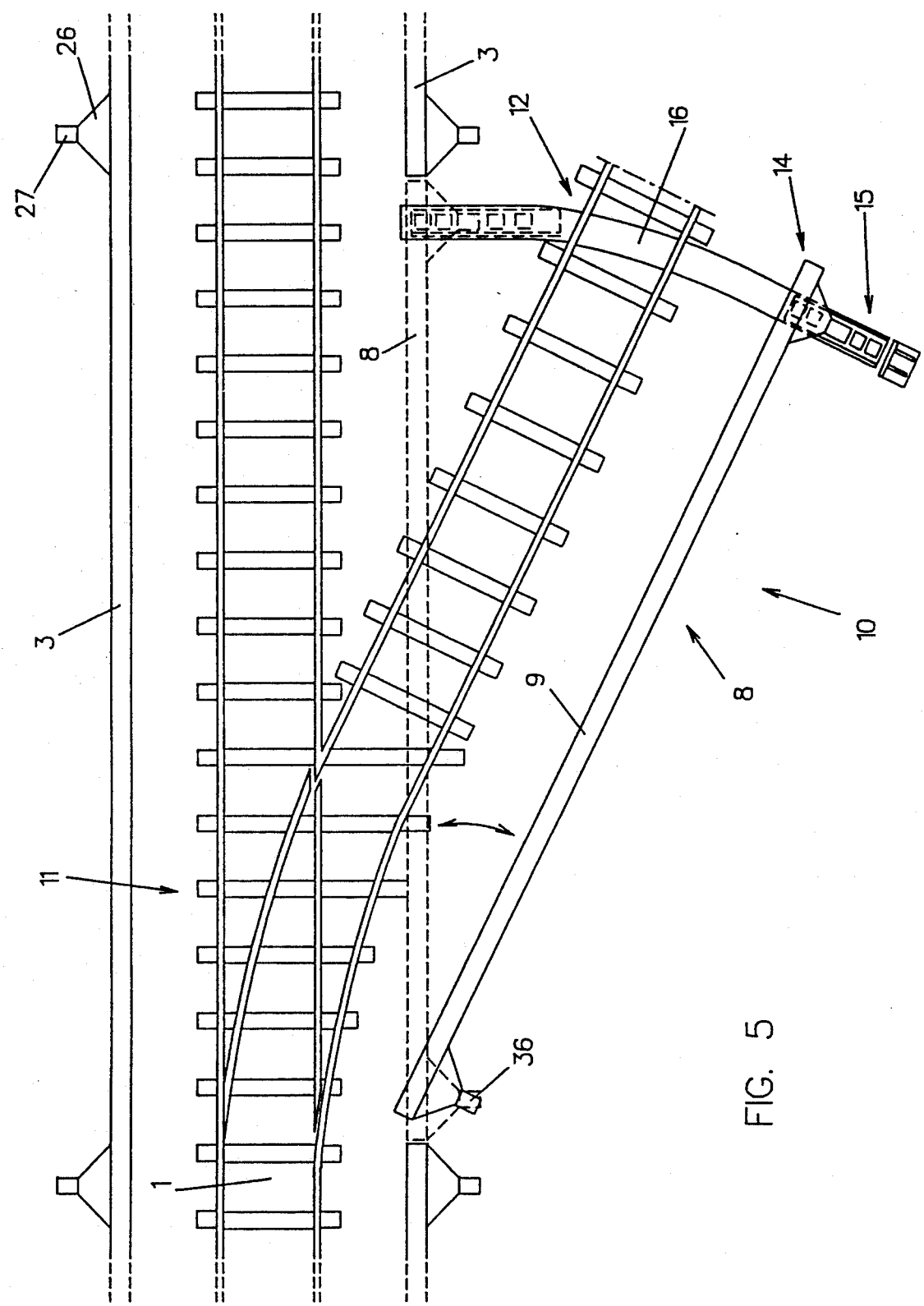
FIG. 5: top view of a branch-off switch.

FIG. 5 shows schematically a branch-off switch of the rail track 1. The switch 11 has a branch-off rail track 12. The section 8 of the magnetic rail 3 which crosses the track clearance profile of this branch-off rail track is constructed as an outward swinging gate 9. The gate 9 is mounted at a swivel bearing 36 and the swinging end 14 of the gate 9 is mounted on a wheel box 15 which rolls on a running plate 16 which crosses the branch-off rail track 12. Known adjustment devices can be used in order to bring the swinging gate 9 into the closed position or into its open position as illustrated in FIG. 5.

Figure 5A:
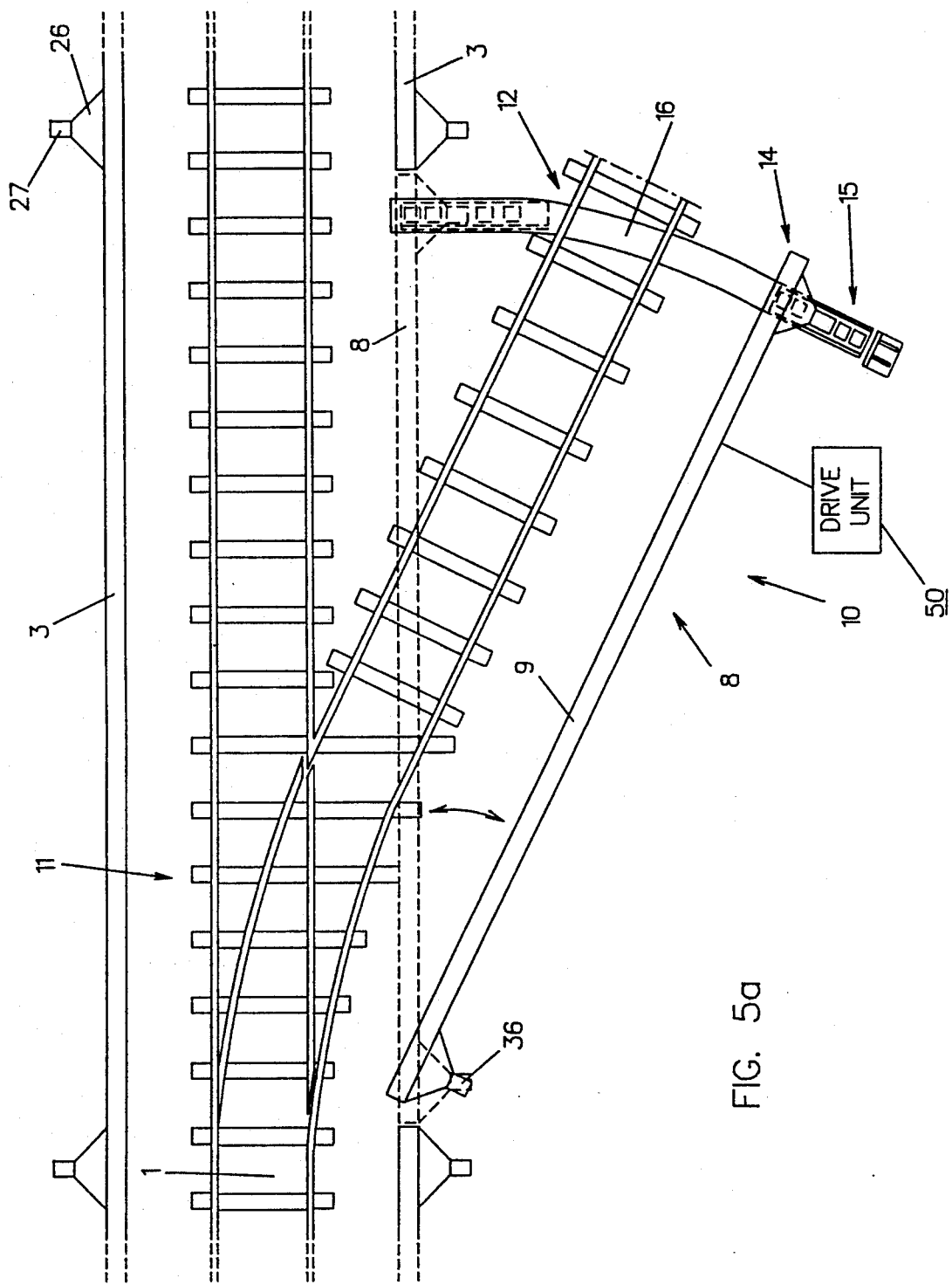
FIG. 5a: top view of a branch of switch.

FIG. 5a shows the branch-off switch of the rail track 1 and the outward swinging gate as shown in FIG. 5, and FIG. 5a also includes a drive unit 50 connected at the swinging or swivelling end of swinging gate 9 for bringing swinging gate 9 into the closed position, as shown by the broken lines, or the open position, as illustrated.

This kind of gate 9 finds application also in a case where at the switch point the rail track 1 does not go straight on but is diverted on a curve out of the magnetic rails 3 of the magnetic track system.

Instead of a straight gate 9, the magnetic rail 3 can be made long enough in the section 8 and, if applicable, so altered in its cross section, so that it can be bent out from its dotted line position whereby the deflectable end 14 is guided as shown on FIG. 5.

FIG. 6 shows an embodiment in which the magnetic rails 3 are deflected to the right in relation to the straight running rail track 1. In this version, the section 8 of the magnetic rail 3 crosses the track clearance profile of the rail track 1 and is constructed as a gate 9 which can be brought to the position shown in dotted lines when a train on the rail track 1 has to be guided out of the magnetic rails 3. In this version the section 8 is made flexible and can be guided in the same way as shown on FIG. 5.

FIG. 6a shows the same embodiment as FIG. 6 and further demonstrates the function of the flexible section 8. Section 8 is made flexible by constructing section 8 from rail segments 39a–d. The segments 39a–d are connected by hinge joints 40a–d. The combination of segments 39a–d and hinge joints 40a–d. The combination of segments 39a–d and hinge joints 40a–d make the rail section 8 flexible. The drive units A–D 60–63 each act on one of the rail segments 39a–d, so that the flexible rail section 8 can be moved into an open position, as shown by the broken lines, or the closed position as illustrated.

FIGS. 7 and 8 show an opening point at which the gate is not swung horizontally, but is moved vertically up from its working position. The gate has a number of sections 9a–9c. On the illustrated example the magnetic rail 3 crosses the track clearance profile of a branch-off rail track 12 of the switch joint 11. In the gate sections 9a, 9b and 9c the magnetic rail sections 8 are mounted on an articulated linkage 17, 18. Provision is made for support posts 22 which, in normal operation carry the magnetic rails. These support posts 22 in their normal working position are secured by a positive fixture 23. Such positive fixtures can be constructed as spigots which engage in the holes provided in the support posts 22.

The linkage bars 17 and 18 are connected at a hinge 19 and the link arm 18 is connected with a driving mechanism 20. Linkage arms 17 and 18, are, as shown on the drawing, connected with each other by means of a working piston 35.

In FIG. 7 the gate 9 is shown in closed position with continuous lines and in open position with dotted lines.

The driving unit 20 is located in a driving unit pit. The radius R shown on FIG. 7 is the distance between the magnetic rail section 8 and the drive 20 and forms at the same time, in a closed position, the hypotenuse of a rectangular triangle whose sides are formed by the linkage bars 17 and 18. When the gate opens, the link arms 17 and 18 are folded together by the working piston 35. By this action the radius R is so reduced that during the upswing the gate section 9b is sure to remain under the overhead line 24.

Figure 9:
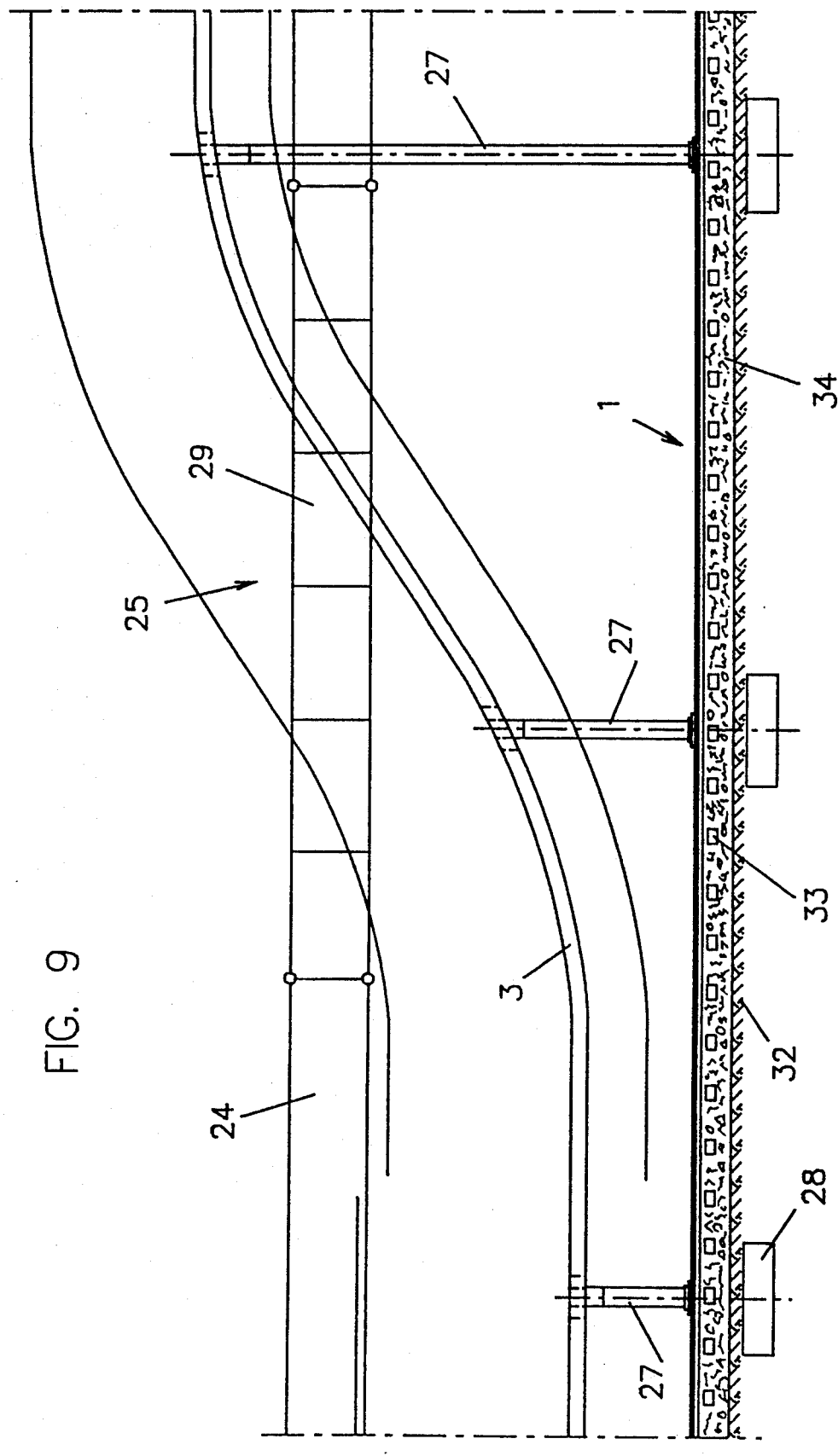
FIG. 9a: schematic view of an opening point at which the magnetic track system is swung upwards.

FIG. 9 shows an opening point at which the magnetic rails 3 are deflected upwards in relation to the rail track 1. The uprights 27 are correspondingly lengthened at the opening point and in the overhead line 24 a window 29 is provided in section 25. The window 29 is so designed that it can be either tilted upwards or shifted sideways.

Figure 9A:
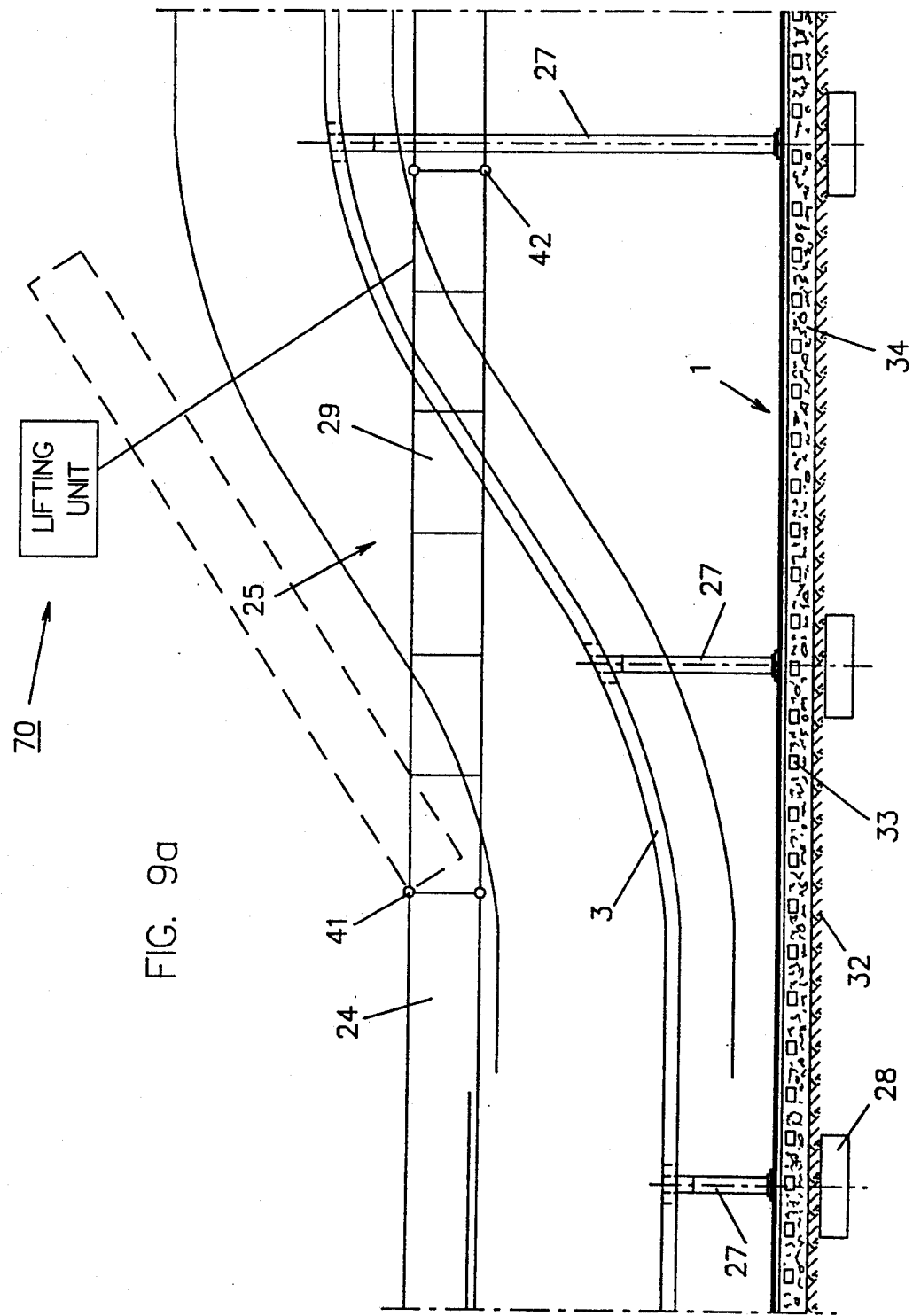

FIG. 9a shows an embodiment of FIG. 9 which opens window 29 by a tilting/lifting action. Window 29 is connected to the over head line 24 by overhead hinge 41 on one end. The other end of window 29 is connected by overhead joint 42. Overhead joint 42 is designed, so that when window 29 is closed, the portion of overhead joint 42 adjacent to window 29 rests on top of the portion of overhead joint 42 adjacent over head line 24. In other words, the window 29 rests on overhead line 24 by means of overhead joint 42 when in the closed position. When in the open position, overhead joint 42 separates. The lifting unit 70 moves window 29 between the closed position as illustrated to the open position as shown in broken lines. In addition, overhead hinge 41 can allow a shifting sideways of the window 29 in relation to the overhead line 24. The shifting sideways of the window 29 preferably occurs under the power of the lifting unit 70 after tilting the window 29.

When in magnetic railway operation a magnetic railway train is to be guided upward at an opening point, the window 29 is opened. In FIGS. 10 and 11 an opening point is schematically represented at which the rail track 1 is displaced downwards in relation to the magnetic rails 3. As the illustrations show, the rail track runs downwards at the opening point between supporting walls 37 and these supporting walls carry the posts 27 for the magnetic rails. As the FIG. 10 shows, the rail track 1 is then guided through a tunnel 38.

Figure 10A:
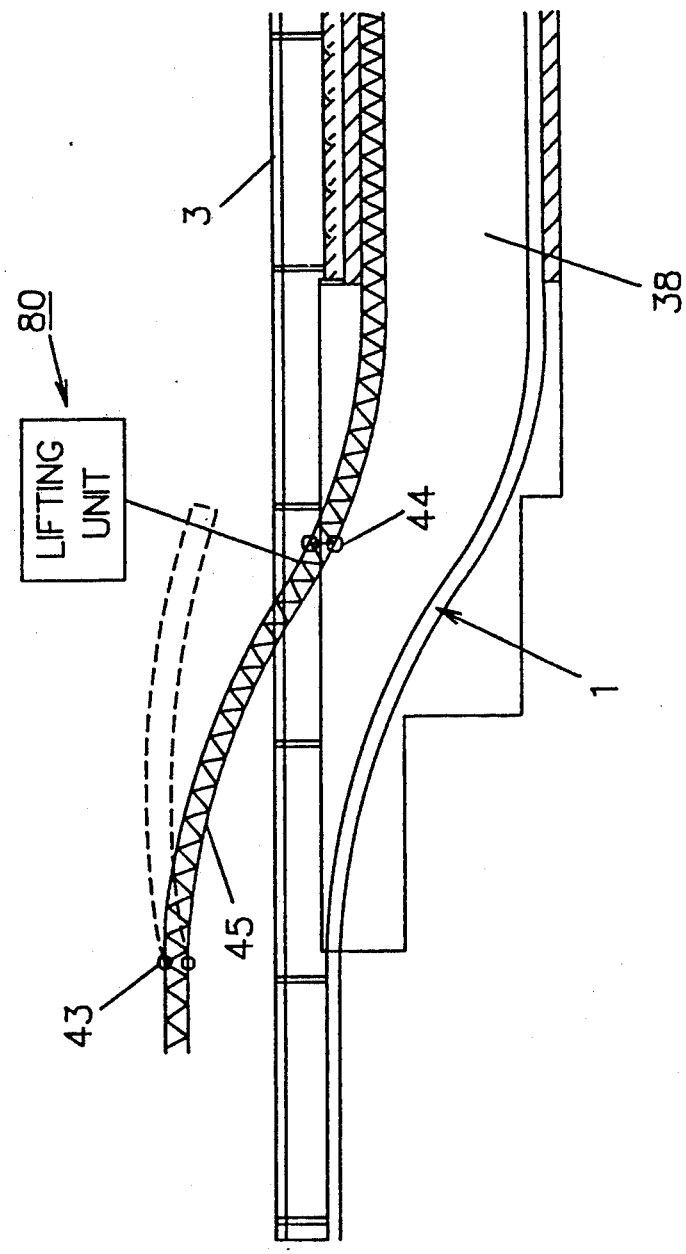
FIG. 10a: longitudinal sectional representation of an opening point at which the wheel/rail system is displaced downwards.
Figure 11:
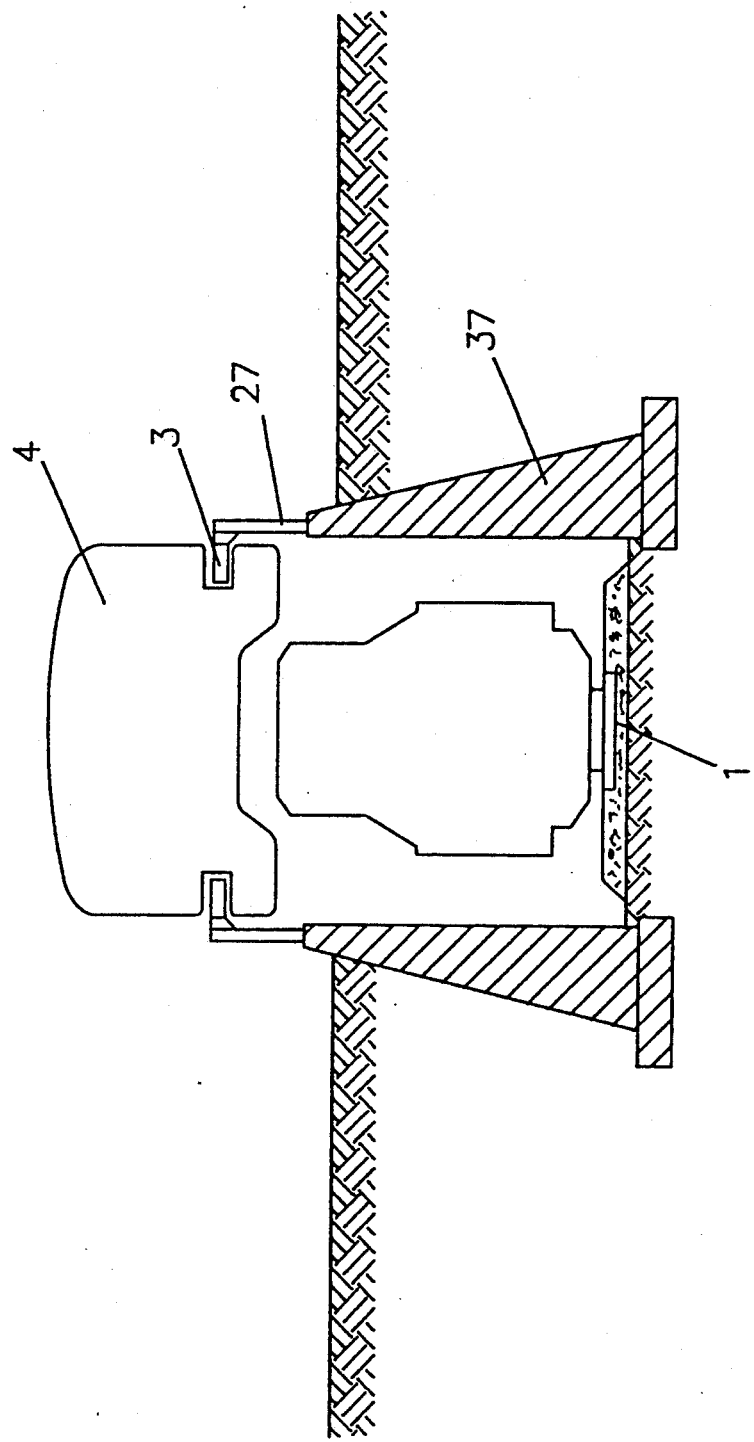
FIG. 11: a cross section view of the opening point shown in FIG. 10.

FIG. 10a shows an embodiment of the invention shown in FIG. 10 but shows window 45 which functions similarly to window 29 shown in FIG. 9a. Overhead hinge 43 and overhead joint 44 function the same as overhead hinge 41 and overhead joint 42. The lifting unit 80 functions to move the window 45 between the closed position illustrated in FIG. 10a and the open position shown in broken lines.

One aspect of the invention resides broadly in a dual track permanent way for a wheel/rail and magnetic railway system in the carriages of which the constructional height lies within the clearance profile of the rail track, the guide magnets are situated within the gauge of the carrier magnets, in which, near each rail of the rail track a magnetic rail runs outside the clearance profile of the rail track, and opening points are provided; at which one system is diverted sideways in relation to the other system, and a magnetic rail section which passes through the clearance profile of the rail track, is constructed as a gate which swings outwards form the clearance profile, and the operating equipment of the wheel/rail system is arranged about side the magnetic rail system's clearance profile.

Another aspect of the invention is a dual track permanent way, characterized in that at an opening point the magnetic rail section which crosses the clearance profile of the rail track, of the branch-off track, of a switch point or a curved rail track, is constructed as a gate which can be swung outwards in a horizontal plane.

Yet another aspect of the invention is a dual track permanent way, characterized in that the swingable end of the gate rests on a wheel box which can be run along a rolling path which crosses the branch-off rail or the curved rail track.

A further aspect of the invention is a dual track permanent way, characterized in that the gate is flexible.

A yet further aspect of the invention is a dual track permanent way, characterized in that at the swinging end of the gate an adjusting drive operates.

Yet another further aspect of the invention is a dual track permanent way, characterized in that the magnetic rail section which at an opening point passes through the clearance profile of a branch track, of a switch point or of a curved rail track, is so constructed so that it can be swung upwards in vertical planes.

An additional aspect of the invention is a dual track permanent way, characterized in that the magnetic rail section is mounted on twin-arm articulated linkages which fold together during the outward swinging movement in such a way that the length of the swing radius is reduced and which unfold during the return swing movement, so that the swing radius increases and the magnet rail section is returned to a functional configuration.

A yet additional aspect of the invention is a dual track permanent way, characterized in that the linkage bars are connected with each other by means of a working cylinder.

A further additional aspect of the invention is a dual track permanent way, characterized in that at rest, both linkage arms form a right angle and the magnetic section is supported by positively fixed support uprights.

A yet further additional aspect of the invention is a dual track permanent way, characterized in that the magnetic section is divided into at least two gate sections.

Another further additional aspect of the invention is a dual track permanent way for wheel/rail and magnetic rail systems the carriages of which have a height which fits inside the clearence profile of the rail track, characterized in that at the opening points the magnetic track system can be moved upwards in relation to the wheel/rail system or the wheel rail system can be moved downwards in relation to the magnetic track system, and the operating equipment of the wheel/rail system is arranged outside the clearance profile of the magnetic track system.

A yet another additional aspect of the invention is a dual track permanent way, characterized in that in the section of an overhead line in which the magnetic rails are deflected upwards, there is a window which can be tilted upwards or shifted sideways.

Another yet further aspect of the invention is a dual track permanent way, characterized in that the uprights to which the magnetic rails are attached are mounted in pairs under the rail track on the foundation beams.

A still further aspect of the invention is a dual track permanent way, characterized in that the uprights to which the magnetic rails are fixed are themselves attached to posts anchored in the earth base near the rail track.

A still further additional aspect of the invention is a dual track permanent way, characterized in that a special sleeper beam is provided on which the rails of the rail track are laid and on which the posts carrying the magnetic rails are mounted.

Patents which disclose systems for magnetically suspended vehicles are U.S. Pat. No. 4,731,569 entitled, "Apparatus for Controlling a Magnet in a Magnetically Suspended Vehicle Having a Linear Stator," U.S. Pat. No. 4,587,472 entitled, "Apparatus for Controlling a Magnet in a Magnetically Suspended Vehicle Having a Linear Stator, U.S. Pat. No. 4,454,820 entitled, "Apparatus for Damping Oscillations of Magnetic Elevated Tracks and Vehicles Floatingly Suspended Thereon," U.S. Pat. No. 3,964,398 entitled, "Magnetic-Suspension Vehicle System Having Switch Tracks," U.S. Pat. No. 3,937,150 entitled, "Magnet System for Use in Electrodynamically Suspended Vehicles," and U.S. Pat. No. 3,895,585 entitled "Two-Sided Linear Induction Motor Especially for Suspended Vehicles.

All, or substantially all, of the components and methods of the various embodiments may be used with at least one embodiment or all of the embodiments, if any, described herein.

The invention as described hereinabove in the context of the preferred embodiments is not to be taken as limited to all of the provided details thereof, since modifications and variations thereof may be made without departing from the spirit and scope of the invention.

What is claimed is:

1. A dual track permanent way for combined use by both wheeled railway carriages and magnetic levitation railway carriages, the magnetic levitation railway carriages having carrier magnets for levitating the magnetic levitation railway carriages and guide magnets for directing the magnetic levitation railway carriages, said dual track permanent way comprising:
   a wheeled railway track for guiding the wheeled railway carriages;
   a plurality of magnetic levitation rails for guiding the magnetic levitation railway carriages;
   at least one of said wheeled railway track, said plurality of magnetic levitation rails, and the wheeled railway carriages being configured to define a first clearance profile through which the wheeled railway carriages operate, which first clearance profile has a first maximum height dimension and a first maximum width dimension;
   at least one of said wheeled railway track, said plurality of magnetic levitation rails, and the magnetic levitation railway carriages being configured to define a second clearance profile through which the magnetic levitation railway carriages operate, which second clearance profile has a second maximum height dimension and a second maximum width dimension;
   said second maximum height dimension through which the magnetic levitation railway carriages operate being disposed within said first maximum height dimension through which the wheeled railway carriages operate;
   said plurality of magnetic levitation railways being disposed outside said first clearance profile;
   means for supporting said plurality of magnetic levitation rails being disposed outside said first clearance profile;
   said plurality of magnetic levitation rails comprising magnets disposed on said plurality of magnetic levitation rails, said rail magnets being for magnetically cooperating with the carrier magnets and guide magnets of the magnetic levitation railway carriages for levitating and directing the magnetic levitation railway carriages;
   gate means for providing an opening area along the permanent way at which one of said wheeled railway track and said plurality of magnetic levitation rails is diverted sideways in relation to the other;
   said gate means comprises a magnetic levitation rail section which passes through the first clearance profile of the wheeled railway carriage; and
   means for moving said magnetic levitation rail section outwards from the first clearance profile of the wheeled railway carriage, said means for moving being configured to move said magnetic levitation rail section independent of said wheeled railway track.

2. The dual track permanent way of claim 1, wherein said wheeled railway track comprises power means, said power means for powering the wheeled railway carriages, said power means being located outside said second clearance profile.

3. The dual track permanent way of claim 2, wherein said gate means for providing an opening along the permanent way is disposed at one of a curved portion of said wheeled railway track and a switch point of said wheeled railway track.

4. The dual track permanent way of claim 3, wherein said means for moving said magnetic levitation rail section outwards from said first clearance profile of the wheeled railway carriage comprises means for swinging said magnetic levitation rail section horizontally outwards from a closed position to an open position.

5. The dual track permanent way of claim 4, wherein said gate means comprises wheel box means for supporting said magnetic levitation rail section, said wheel box means for being moved along a rolling path which crosses said wheeled railway track when said gate means moves between said closed position and said open position.

6. The dual track permanent way of claim 4, wherein said magnetic levitation rail section is configured to be flexible.

7. The dual track permanent way of claim 5, wherein said means for moving said magnetic levitation rail section comprises a drive unit for swinging an end of said magnetic levitation rail section horizontally.

8. The dual track permanent way of claim 6, wherein said means for moving said magnetic levitation rail section comprises a drive unit for swinging an end of said magnetic levitation rail section horizontally.

9. A dual track permanent way for combined use by both wheeled railway carriages and magnetic levitation railway carriages, the magnetic levitation railway carriages having carrier magnets for levitating the magnetic levitation railway carriages and guide magnets for directing the magnetic levitation railway carriages, said dual track permanent way comprising:
   a wheeled railway track for guiding the wheeled railway carriages;
   a plurality of magnetic levitation rails for guiding the magnetic levitation railway carriages;
   at least one of said wheeled railway track, said plurality of magnetic levitation rails, and the wheeled railway carriages being configured to define a first clearance profile through which the wheeled railway carriages operate, which first clearance profile has at least a first height dimension and a first width dimension;
   at least one of said wheeled railway track, said plurality of magnetic levitation rails, and the magnetic levitation railway carriages being configured to define a second clearance profile through which the magnetic levitation railway carriages operate, which second clearance profile has at least a second height dimension and a second width dimension;
   said second height dimension through which the magnetic levitation railway carriages operate being within said first height dimension through which the wheeled railway carriages operate;
   means for supporting said plurality of magnetic levitation rails being disposed outside said first clearance profile;
   said plurality of magnetic levitation rails comprising magnets disposed on said plurality of magnetic levitation rails, said rail magnets being for magnetically cooperating with the carrier magnets and guide magnets of the magnetic levitation railway carriages for levitating and directing the magnetic levitation railway carriages;

gate means for providing an opening area along the permanent way at which one of said wheeled railway track and said plurality of magnetic levitation rails is diverted sideways in relation to the other;

said gate means comprising a magnetic levitation rail section which passes through the first clearance profile of the wheeled railway carriage;

means for moving said magnetic levitation rail section outwards from the first clearance profile of the wheeled railway carriage;

said gate means for providing an opening along the permanent way is disposed at one of a curved portion of said wheeled railway track and a switch point of said wheeled railway track; and said means for moving said magnetic levitation rail section outwards from the first clearance profile of the wheeled railway carriage comprising means for vertically swinging said magnetic levitation rail section upwards from a closed position to an open position.

10. The dual track permanent way of claim 9, wherein said means for swinging said magnetic levitation rail section vertically upwards comprises a plurality of twin-arm linkages on which said magnetic levitation rail section is mounted, said plurality of twin-arm linkages being configured to fold together during the upward swinging movement so that the length of the swinging radius is shortened and said plurality of twin-arm linkages being configured to extend apart during the return downward swinging movement so that the length of the swinging radius is lengthened.

11. The dual track permanent way of claim 10, wherein each of said plurality of twin-arm linkages comprises linkage bars connected to one another by a working cylinder.

12. The dual track permanent way of claim 11, comprises support uprights for supporting said magnetic levitation rail section when in the closed position and means for fixing said support uprights when in the closed position, and wherein said linkage bars form a right angle when in the close,.d position.

13. The dual track permanent way of claim 12, wherein said magnetic levitation rail section comprises a plurality of sections.

14. The dual track permanent way of claim 1, wherein one of:
said wheeled railway track is configured to move downward in relation to said plurality of magnetic levitation rails, and
said plurality of magnetic levitation rails is configured to move upward in relation to said wheeled railway track.

15. A dual track permanent way for combined use by both wheeled railway carriages and magnetic levitation railway carriages, the magnetic levitation railway carriages having carrier magnets for levitating the magnetic levitation railway carriages and guide magnets for directing the magnetic levitation railway carriages, said dual track permanent way comprising:
a wheeled railway track for guiding the wheeled railway carriages;
a plurality of magnetic levitation rails for guiding the magnetic levitation railway carriages;
at least one of said wheeled railway track, said plurality of magnetic levitation rails, and the wheeled railway carriages being configured to define a first clearance profile through which the wheeled railway carriages operate, which first clearance profile has at least a first height dimension and a first width dimension;
at least one of said wheeled railway track, said plurality of magnetic levitation rails, and the magnetic levitation railway carriages being configured to define a second clearance profile through which the magnetic levitation railway carriages operate, which second clearance profile has at least a second height dimension and a second width dimension;
said second height dimension through which the magnetic levitation railway carriages operate being within said first height dimension through which the wheeled railway carriages operate;
means for supporting said plurality of magnetic levitation rails being disposed outside said first clearance profile; and
said profile of magnetic levitation rails comprising magnets disposed on said plurality of magnetic levitation rails, said rail magnets being for magnetically cooperating with the carrier magnets and guide magnets of the magnetic levitation railway carriages for levitating and directing the magnetic levitation railway carriages;
said plurality of magnetic levitation rails being configured to move upward in relation to said wheeled railway track;
said wheeled railway track comprising an over head power line;
said overhead power line comprising a gate for at least one of tilting upwards and shifting sideways, for removing a section of said overhead line from the second clearance profile of the magnetic levitation railway carriages and allowing the magnetic levitation railway carriages to pass upward.

16. The dual track permanent way of claim 1, wherein said means for supporting said plurality of magnetic levitation rails comprises:
a plurality of upright members on which said plurality of magnetic levitation rails are mounted; and
a plurality of foundation beams on which said plurality of upright members are mounted, said plurality of foundation beams being under the wheeled railway track.

17. The dual track permanent way of claim 1, wherein said means for supporting said plurality of magnetic levitation rails comprises:
a plurality of upright members on which said plurality of magnetic levitation rails are mounted; and
a plurality of posts on which said plurality of upright members are mounted, said plurality of posts being anchored in the earth base adjacent to the wheeled railway track.

18. The dual track permanent way of claim 1, wherein said means for supporting said plurality of magnetic levitation rails comprises:
a plurality of uprights on which said plurality of magnetic levitation rails are mounted; and
a plurality of sleepers on which said plurality of uprights are mounted and also on which said wheeled railway track is mounted, said plurality of sleepers being anchored in the earth base.

* * * * *

UNITED STATES PATENT AND TRADEMARK OFFICE
CERTIFICATE OF CORRECTION

PATENT NO. : 5,156,092

DATED : October 20, 1992

INVENTOR(S) : Helmut HIRTZ

It is certified that error appears in the above-identified patent and that said Letters Patent is hereby corrected as shown below:

In column 6, lines 17-18, after '40a-d', delete "The combination of segments 39a-d and hinge joints 40a-d.".

In column 6, line 30, after 'switch', delete "joint" and insert --point--.

In column 11, line 45, Claim 12, after 'the', delete "clos,.d" and insert --closed--.

Signed and Sealed this

Twenty-sixth Day of October, 1993

*Attest:*

BRUCE LEHMAN

*Attesting Officer*     *Commissioner of Patents and Trademarks*